Sept. 10, 1963         A. A. PECCI         3,103,575
ELECTRIC HEATING SYSTEM
Filed July 1, 1960         3 Sheets-Sheet 1
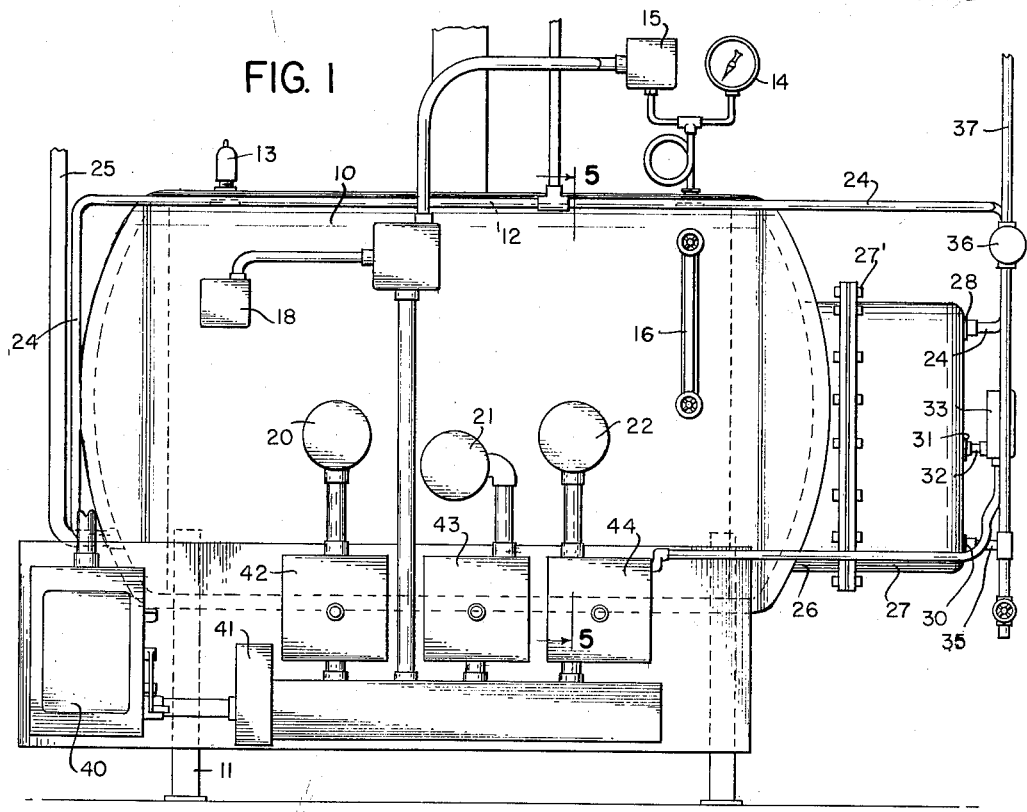
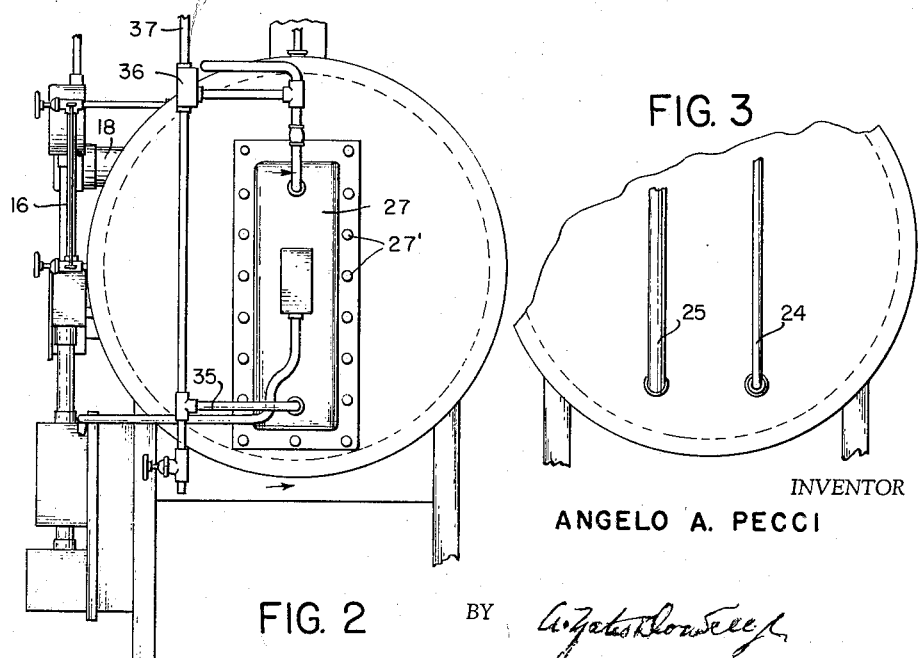
INVENTOR
ANGELO A. PECCI
BY *A. Yates Dowsell*
ATTORNEY

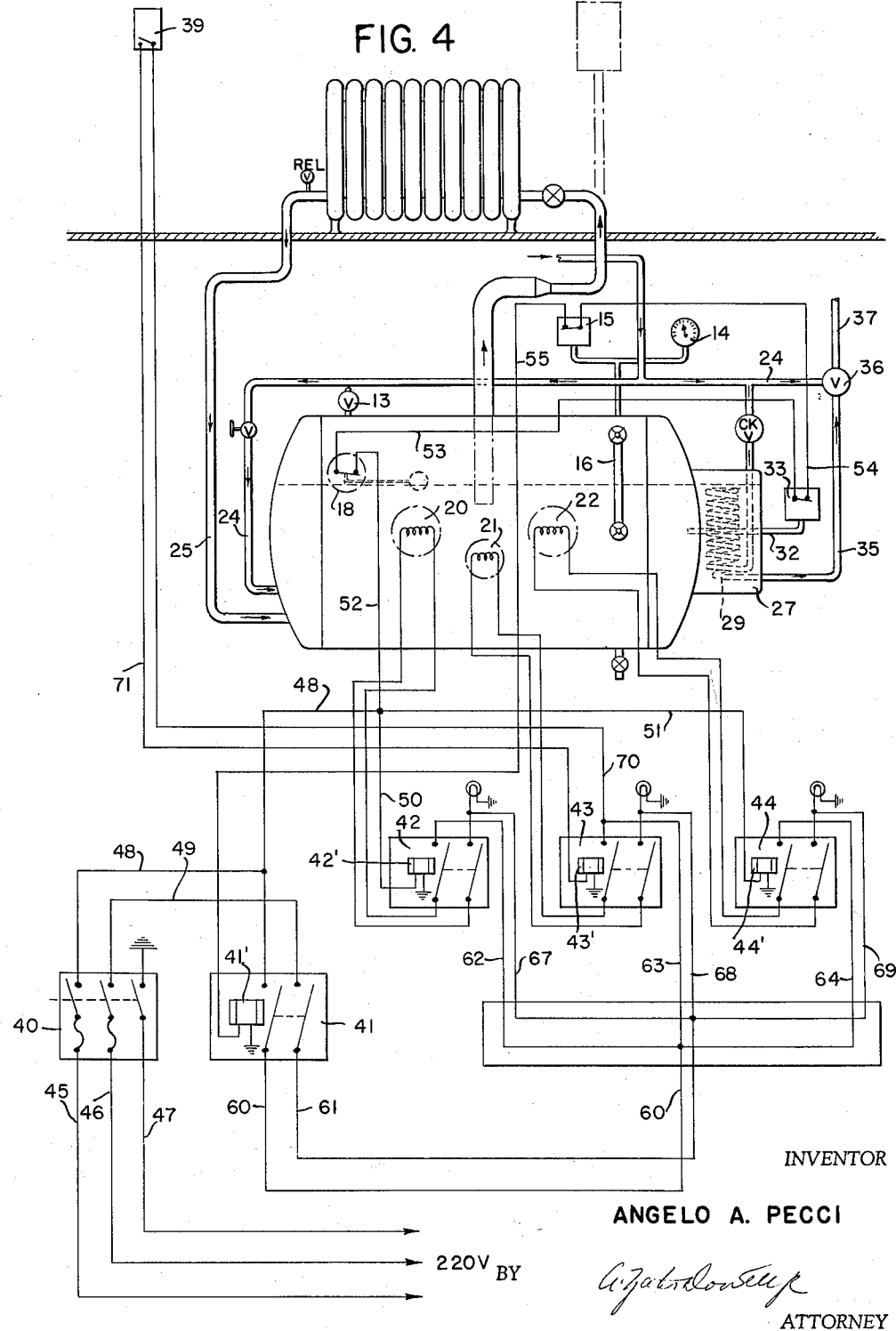

Sept. 10, 1963  A. A. PECCI  3,103,575
ELECTRIC HEATING SYSTEM
Filed July 1, 1960  3 Sheets-Sheet 3

INVENTOR
ANGELO A. PECCI
BY
ATTORNEY

United States Patent Office 3,103,575
Patented Sept. 10, 1963

3,103,575
ELECTRIC HEATING SYSTEM
Angelo Anthony Pecci, 1 6th St., Clifton, N.J.
Filed July 1, 1960, Ser. No. 40,468
6 Claims. (Cl. 219—38)

This invention relates to heating and more particularly to an electrically operated boiler for space and hot water heating.

In recent times heating systems, particularly for domestic use, have been operated by coal, fuel oil and gas and have employed steam, hot water and air as the motive fluids. As the population has increased and conditions have become more crowded, impurities in the air have become a greater nuisance. Additionally, automatic systems requiring a minimum of attention and having a maximum degree of safety have been demanded. A further need has been for systems which are compact and which may be used for supplying steam, hot water or hot air in accordance with the user's demand.

Accordingly, it is an object of the present invention to provide a compact electrically operated heating device and system adapted to supply steam, hot water or hot air for space heating and to supply hot water for user consumption, which is fully automatic, including having requirement responsiveness and safety controls and which does not produce a harmful byproduct of combustion nor require an exhaust chimney.

Another object is to provide an electrically operated heating system having safety controls including a water temperature control, a pressure control, and a low water control with normally closed operating switches connected in series whereby electrical energy to the heating units will be cut off upon the opening of any of the safety controls.

Another object is to provide an electrically operated heating system having one or more heating units controlled by a water temperature-responsive switch and one or more units responsive to a space temperature-responsive switch.

Figure 5:
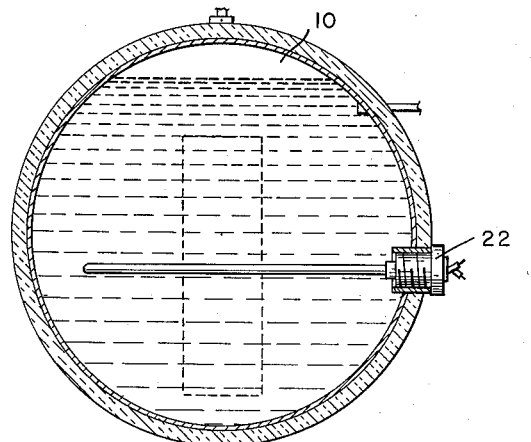
Figure 6:
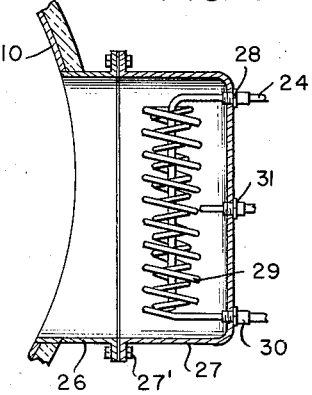
Figure 7:
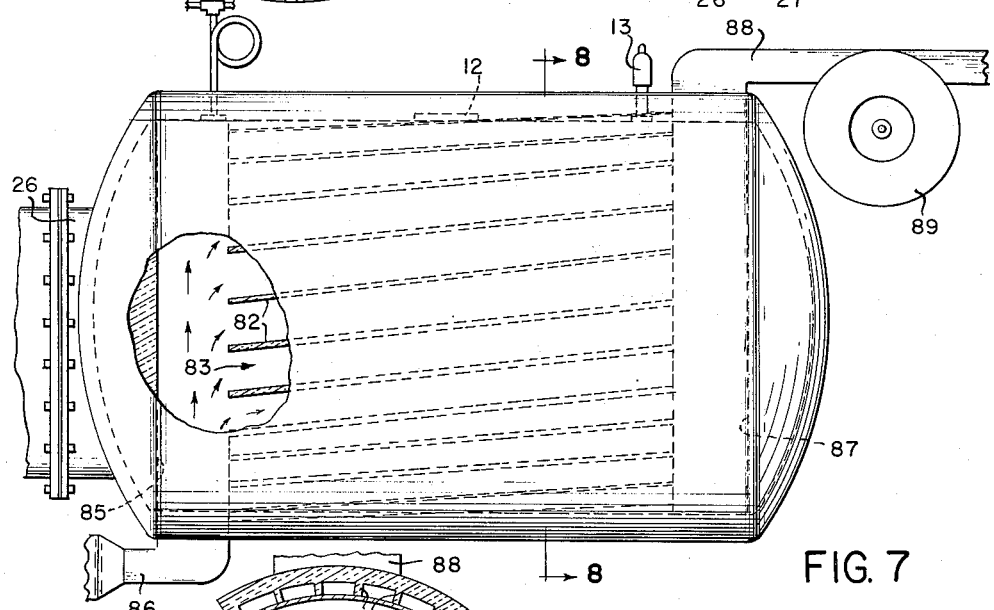
Figure 8:
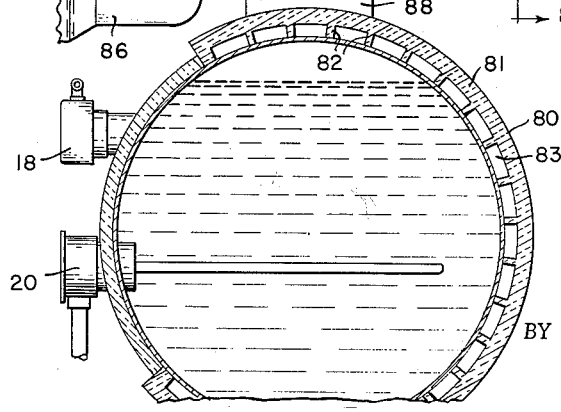

These and other objects of the invention will become apparent from the following description taken in conjunction with the accompanying drawings, in which:

FIG. 1 is a side elevation of apparatus constructed in accordance with the present invention;

FIG. 2, an end view of the apparatus of FIG. 1 illustrating the user hot water supply connections;

FIG. 3, a fragmentary end view of the opposite end of the apparatus of FIG. 1;

FIG. 4, a diagrammatic layout of the apparatus of the present invention, including the circuitry and control and illustrating a manner of using the same;

FIG. 5, a section through the boiler on the line 5—5 of FIG. 1;

FIG. 6, a fragmentary longitudinal section of the hot water heating coil housing;

FIG. 7, a schematic rear elevation of the device of FIG. 1 modified by the provision of air passages around a portion of the boiler; and FIG. 8, a section on the line 8—8 of FIG. 7.

Briefly stated, the present invention includes an electrically heated boiler for supplying steam, hot water or hot air for space heating and having an indirectly heated water coil for supplying hot water for user consumption. The power supply to the system is subject to controls responsive to water level, pressure and temperature within the boiler. Subject to the foregoing controls, one or more heating units operate to maintain a predetermined temperature range of the water in the boiler. Also subject to the foregoing controls, one or more additional units operate upon demand from temperature-responsive means in the space.

With further reference to the drawings, a substantially cylindrical boiler 10, which may be of either the horizontal or vertical type, is mounted on suitable supports 11. The boiler has a relatively large flanged opening 12 at its upper central portion for the outward passage of steam or hot water. Relatively small flanged openings are provided along its top but spaced nearer the ends for a safety valve 13 and a pressure gauge 14 the gauge communicating with a pressure operated electric switch 15. On the front of the boiler at its upper portion are suitable openings for a sight gauge 16 and for a water level responsive low water cut-off switch 18. Mounted just below the center line are a plurality of electric heating units 20, 21 and 22 which extend into the boiler as indicated in FIG. 5.

At the left end of the tank as viewed in FIG. 1 (see FIG. 3) is a fresh water supply line 24 and a water or steam return line 25.

The right end of the tank as viewed in FIG. 1 has a manhole extension 26 with an outwardly turned flange. An auxiliary housing 27 has a flange adapted to be connected to the flange of the manhole extension by suitable fastening means 27' and having a gasket disposed between the cooperating flanges. The manhole extension 26 and auxiliary housing 27 are elongated and of considerably less width than the diameter of the boiler 10, although its dimensions may be determined in accordance with the particular requirements of the installation.

Housing 27 has an upper connection 28 for the fresh water pipe 24. A double coil 29 is positioned within the housing 27 and is connected to the fresh water pipe 24 in such a manner that water within the coil is retained within the boiler for a sufficient length of time to heat the water within the coil to substantially the same temperature as the water within the boiler even though the water in the coil which is to be used by the consumer is flowing continuously. The opposite end of the double coil 29 is connected to an outlet 30 at the lower end of the housing 27. An intermediate connection 31 in the housing is provided for a temperature-responsive element 32 which controls the operation of an electric switch 33. A discharge pipe 35 connected to the outlet 30 passes through a thermostatic mixing valve 36 connected to the fresh water line 24 in order that water of the desired temperature may be supplied to the line 37 for domestic needs.

Although three heating units 20, 21 and 22 are described, the number may be varied in accordance with the needs, the number shown being merely representative. In order to promote efficient heating, one of the units, as for example, the central unit 21, is preferably positioned slightly below the others in order to apply heat to the water at a different level. The units are preferably of the well known immersion type, conventionally mounted as indicated in FIG. 5.

In order to operate the system automatically and safely, an electrical control system is employed. The system operates in response to the water level control switch 18, the pressure switch 15, the water temperature switch 33, and a space thermostat 39. The electrical circuit includes a manually operated main line switch 40, a magnetically operated main line starter switch 41, and magnetically operated unit starter switches 42, 43 and 44 connected to heating units 20, 21 and 22, respectively.

Although a three-wire grounded system is illustrated, an equivalent operating and control circuit operating on other types of electrical power supply could obviously be employed. In the system disclosed main line switch 40 is connected to power lines 45, 46 and 47, the latter being grounded. In the closed position the switch connects the lines 45 and 46 to supply lines 48 and 49, respectively, to supply electrical energy to the main line switch 41. Line 48 is connected by branch lines 50, 51 to relays or solenoids 42' and 44' of the unit starter switches 42 and 44, respectively, the other side of the solenoids being grounded. Hence, the closing of switch 40 results in the closing of switches 42 and 44.

Line 48 is also connected by lead 52 to one side of the low water switch 18. The other side of low water switch 18 is connected by lead 53 to one side of water-temperature-responsive switch 33. The other side of switch 33 is connected by lead 54 to one side of pressure-responsive switch 15, the other side of switch 15 being connected by lead 55 to a relay or solenoid 41' of the main line magnetic starter switch 41, such solenoid being grounded as indicated.

As a result of the series connection of switches 18, 33 and 15 to solenoid 41' and to supply line 48, the condition of switch 41 is dependent upon the condition of switches 18, 33 and 15. Assuming that main line switch 40 is closed and that condition-responsive switches 18, 33 and 15 of the boiler are closed, then switch 41 is closed.

In closed condition, switch 41 closes the circuit from the main lines 45, 46 through lines 48, 49 to the lines 60, 61 from switch 41.

From line 60 leads 62, 63 and 64, respectively, are connected to one terminal of the switches 42, 43 and 44. From line 61 leads 67, 68 and 69 are connected to the other terminal of such switches. Thus, with switches 40 and 41 closed, switches 42 and 44 remain closed to supply power to energize heating units 20 and 22, respectively. In the event that any one of switches 18, 33 or 15 associated with the boiler opens, switch 41 will open, thereby cutting off the supply of electrical energy to the terminals of switches 42 and 44, even though such switches remain closed.

In order to close switch 43, it is necessary to complete the circuit from lines 63 and 70 to space thermostat 39, and through said thermostat to line 71 connected to grounded relay or solenoid 43'. Hence, operation of heating unit 21 depends upon space thermostat 39, but the latter may be overridden by the opening of any of switches 18, 33 and 15, responsive to boiler conditions.

During normal wintertime operation units 20 and 22 supply heat adequate for the lower temperature range of the space and for the hot water supply. If additional heat is required by thermostat 39 it will cause the operation of unit 21. In summertime operation, when there is no demand from thermostat 39, units 20 and 22 will operate sufficiently to supply the demands from temperature-responsive element 32 located adjacent to the hot water heating coil 29, element 32 being conventionally adjustable by the user for different limits of operation in summer and winter. In the event of any undesirable or emergency condition, such as the lowering of the water level within the boiler below a predetermined level, or the increase of pressure or temperature above a predetermined value, the main magnetic switch 41 opens and cannot close until any unsafe condition is corrected.

In order that the system may supply heated air for space heating, the boiler may be provided, as indicated in FIGS. 7 and 8, with a shell 80 having insulation 81 on its outer portion and having longitudinally spaced ribs 82 on its inner portion providing a plurality of air passages 83 longitudinally along the outer surface of the boiler. A supply header 85 is provided at one end, connected to an inlet duct 86, and a discharge header 87 is connected at the other end with a discharge duct 88, duct 88 preferably being mounted substantially 180° from duct 86. Boiler outlet 12 is closed. A blower 89 is provided in the duct 88 for conveying air to the space. The blower may be provided with the customary controls (not shown) to cause it to operate when the temperature of the air in duct 88 is between predetermined upper and lower levels.

Although the boiler of FIGS. 1–6 may be insulated conventionally, a preferred embodiment is to employ a boiler having a shell as illustrated in FIGS. 7 and 8 even though the boiler is used to supply steam or hot water for space heating. In such embodiment the inlet and outlet air ducts are capped, the closed air spaces along the boiler assisting in its insulation. Such a boiler, it will be apparent, may readily be used for supplying steam, hot water, or hot air for space heating, in addition to supplying hot water for user consumption.

Accordingly, it will be understood that the invention includes a boiler having electrical heating elements and which may provide steam, hot water or hot air for space heating as desired, and which has an indirect tankless heater for domestic hot water.

The heating units are all subject to water level, pressure, and temperature-responsive control in the boiler, and at least one is also responsive to space temperature control, whereby the device may supply heat for space and domestic hot water consumption as required and with safety and efficiency.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A space heating system comprising a horizontal cylindrical boiler, a plurality of electric heating units applied to said boiler, said boiler having supply and return connections for motive fluid, a substantially vertical housing projecting from one end of said boiler and having a width substantially less than the diameter of the boiler, a water heating coil positioned in said housing, connections in said housing for the supply of fresh water to said coil and its discharge therefrom, a by-pass from said supply to said discharge, a temperature-responsive mixing valve at the junction of the supply and said discharge, said boiler having connections for the supply of make-up water, and means for controlling the operation of said heating units, said control means comprising a manual main line switch, a magnetic main switch connected to said main line switch, a series connected water level-responsive switch, pressure responsive switch and temperature-responsive switch on said boiler, said magnetic main switch being closed by a grounded circuit from one of the leads of said main line switch through said water level, pressure and temperature responsive switches, whereby said magnetic main switch normally remains closed when said main line switch is closed subject to being opened by the opening of any one or more of said water level, pressure and temperature-responsive switches on said boiler, and a magnetic unit switch connected to each of said heating units and to said magnetic main switch, the magnetic control for at least one of said magnetic unit switches being connected to a line from said manual line switch, and a temperature-responsive switch in said space, the magnetic control for another of said magnetic unit switches being connected to said magnetic main switch and in series with said temperature responsive swtich in said space.

2. A control system for a boiler heated by a plurality of electrical heating units, said control system comprising electrically operated switch means for each of said units, electrically operated supply switch means, manually operated line switch means, condition-responsive means in said boiler connected to the electrically operated portion of said supply switch means and to said line switch means, one of said unit switches having its electrically operated means attached to said line switch means, space condition-responsive switch means, a second unit switch having its electrically operated means attached to said space condition-responsive switch means and to said supply switch means, whereby, after the closing of said line switch means, the operation of all of said units is primarily dependent upon the conditions within said boiler and the operation of said second unit is secondarily responsive upon conditions in said space.

3. A control system as defined in claim 2, in which the electrical heating unit of said second unit is positioned at a lower level in the boiler than the electrical heating unit connected with said one unit switch whereby natural circulation and the heating of a greater portion of the water in said boiler is effected responsive to demand from said space condition-responsive switch means.

4. A combined space and hot water heater comprising a boiler, a plurality of electric heating units on said boiler, means for the discharge and return of motive fluid from and to said boiler, said boiler having an auxiilary housing of reduced size extending from a wall thereof and with its interior communicating with the interior of the boiler, a water coil positioned within said auxiliary housing, control means responsive to the temperature of the water within said auxiliary housing, other control means responsive to the temperature within the space, said heating units being primarily responsive to the control in said auxiliary housing, and at least one of said heating units being secondarily responsive to the space temperature control means.

5. A control system for a space heating boiler heated by a plurality of electrical heating units, said boiler having condition-responsive means therewithin, condition-responsive means in the space, said control system comprising electrically operated switch means for each of said units, an electrically operated supply switch, the operating means for said supply switch being connected to said condition-responsive means in said boiler, the operating means for at least one of said unit switches being connected to the space condition-responsive means, whereby said heating units are primarily controlled in response to conditions within the boiler and said one unit is secondarily controlled by conditions in said space.

6. A combined space and hot water heater comprising a substantially cylindrical boiler, a plurality of heating units on said boiler, a shell mounted on and substantially surrounding said boiler, said shell having insulation on its outer portion and having vanes extending longitudinally of said boiler and providing a multiplicity of air passages between said boiler and said insulation, inlet and outlet means for water in said boiler, inlet and outlet means for introducing air into said air passages at one end of said boiler and for discharge at its other end, means for closing said inlet and outlet means whereby said air passages may provide insulation, control means responsive to the temperature of the water within said boiler, other control means responsive to the temperature within the space, said heating units being primarily responsive to the control in said boiler, and at least one of said heating units being secondarily responsive to the space temperature control means.

References Cited in the file of this patent

UNITED STATES PATENTS

| | | |
|---|---|---|
| 1,184,430 | De Khotinsky | May 23, 1916 |
| 1,657,932 | Kukec | Jan. 31, 1928 |
| 2,017,831 | Grosseth | Oct. 15, 1935 |
| 2,170,507 | Rice et al. | Aug. 22, 1939 |
| 2,225,023 | Wate | Dec. 17, 1940 |
| 2,348,610 | Colby | Mar. 9, 1944 |
| 2,461,774 | Robertson | Feb. 15, 1949 |
| 2,511,635 | Holmes | June 13, 1950 |
| 2,533,508 | Riu | Dec. 12, 1950 |
| 2,654,361 | Losching | Oct. 6, 1953 |
| 2,677,749 | Raider | May 4, 1954 |
| 2,706,240 | Hackman | Apr. 12, 1955 |
| 2,781,174 | Smith | Feb. 12, 1957 |